United States Patent
LaBlanc et al.

(10) Patent No.: US 10,633,581 B2
(45) Date of Patent: *Apr. 28, 2020

(54) COMPOSITION AND METHOD FOR IMPROVED TREATMENT FLUID

(71) Applicant: HALLIBURTON ENERGY SERVICES, INC., Houston, TX (US)

(72) Inventors: Benjamin Edward LaBlanc, Humble, TX (US); Enrique Antonio Reyes, Tomball, TX (US); Alyssa Lynn Smith, Humble, TX (US); Aaron Michael Beuterbaugh, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/511,182

(22) PCT Filed: Nov. 12, 2014

(86) PCT No.: PCT/US2014/065268
§ 371 (c)(1),
(2) Date: Mar. 14, 2017

(87) PCT Pub. No.: WO2016/076862
PCT Pub. Date: May 19, 2016

(65) Prior Publication Data
US 2017/0275527 A1    Sep. 28, 2017

(51) Int. Cl.
| | | |
|---|---|---|
| *C09K 8/512* | (2006.01) | |
| *C09K 8/88* | (2006.01) | |
| *C09K 8/514* | (2006.01) | |
| *C09K 8/72* | (2006.01) | |
| *C09K 8/90* | (2006.01) | |
| *C09K 8/76* | (2006.01) | |
| *C09K 8/68* | (2006.01) | |

(52) U.S. Cl.
CPC .............. *C09K 8/887* (2013.01); *C09K 8/512* (2013.01); *C09K 8/514* (2013.01); *C09K 8/685* (2013.01); *C09K 8/725* (2013.01); *C09K 8/76* (2013.01); *C09K 8/90* (2013.01); *C09K 8/905* (2013.01)

(58) Field of Classification Search
CPC .......... C09K 8/74; C09K 8/035; C09K 8/528; C09K 8/54; C09K 8/72; C09K 8/56; C09K 8/62; C09K 8/725; C09K 8/80; C09K 8/86; C09K 8/92; C09K 8/512; C09K 8/514; C09K 8/52; C09K 8/66; C09K 8/68; C09K 8/70; C09K 8/03; C09K 8/08; C09K 8/10; C09K 8/12; C09K 8/42; C09K 8/524; C09K 8/57; C09K 8/58; C09K 8/60; C09K 8/76; C09K 8/94; E21B 43/25; E21B 37/06; E21B 41/02; E21B 43/26; E21B 17/01; E21B 43/267; E21B 21/003; E21B 37/00; E21B 43/04; E21B 43/28; E21B 47/12

See application file for complete search history.

(56) References Cited

U.S. PATENT DOCUMENTS

| | | | | |
|---|---|---|---|---|
| 5,019,343 A | * | 5/1991 | Hwa .................. | C02F 5/14 252/387 |
| 5,069,798 A | * | 12/1991 | Hwa .................. | C02F 5/14 210/700 |
| 6,640,898 B2 | | 11/2003 | Lord et al. | |
| 7,013,974 B2 | | 3/2006 | Haines, Jr. | |
| 2010/0048429 A1 | * | 2/2010 | Dobson, Jr. ............ | E21B 43/25 507/212 |
| 2013/0000902 A1 | | 1/2013 | Welton et al. | |
| 2013/0023449 A1 | * | 1/2013 | Heath ................... | C09K 8/528 507/221 |
| 2013/0213657 A1 | * | 8/2013 | Dobson, Jr. ............ | C09K 8/24 166/308.5 |

FOREIGN PATENT DOCUMENTS

| | | |
|---|---|---|
| EP | 1617039 A1 | 1/2006 |
| WO | 2012-080299 A1 | 6/2012 |
| WO | 2012-080463 A1 | 6/2012 |
| WO | 2012-127183 A1 | 9/2012 |
| WO | 2012-171858 A1 | 12/2012 |
| WO | 2014-164835 A1 | 10/2014 |

\* cited by examiner

*Primary Examiner* — Kumar R Bhushan
(74) *Attorney, Agent, or Firm* — McAfee & Taft

(57) ABSTRACT

A composition and method for using seawater as a treatment fluid is provided. The treatment fluid comprises N-(phosphonomethyl)iminodiacetic acid and seawater. The provided treatment fluid is stable and viscous, even at high temperatures and a high pH.

18 Claims, 6 Drawing Sheets

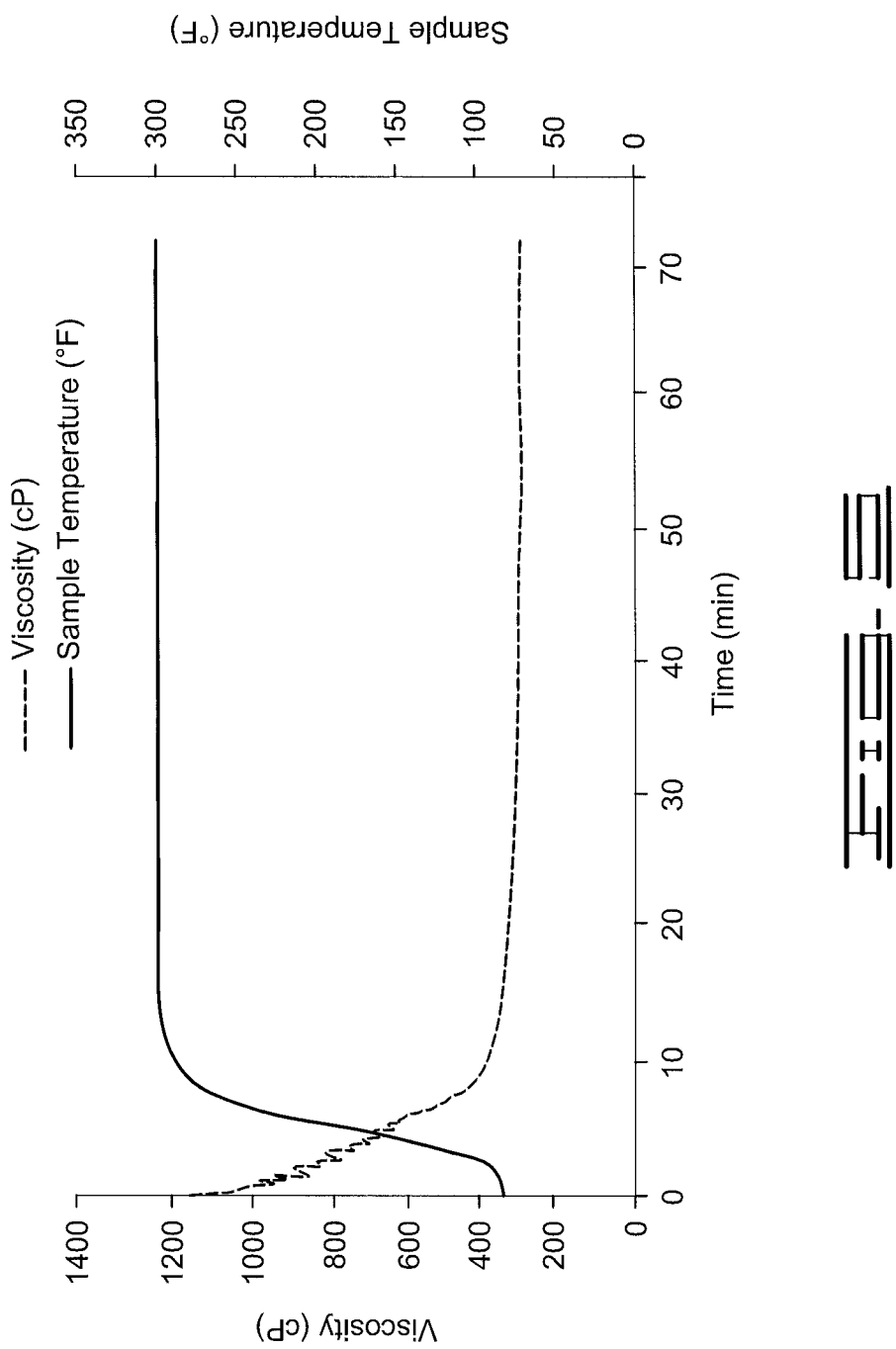

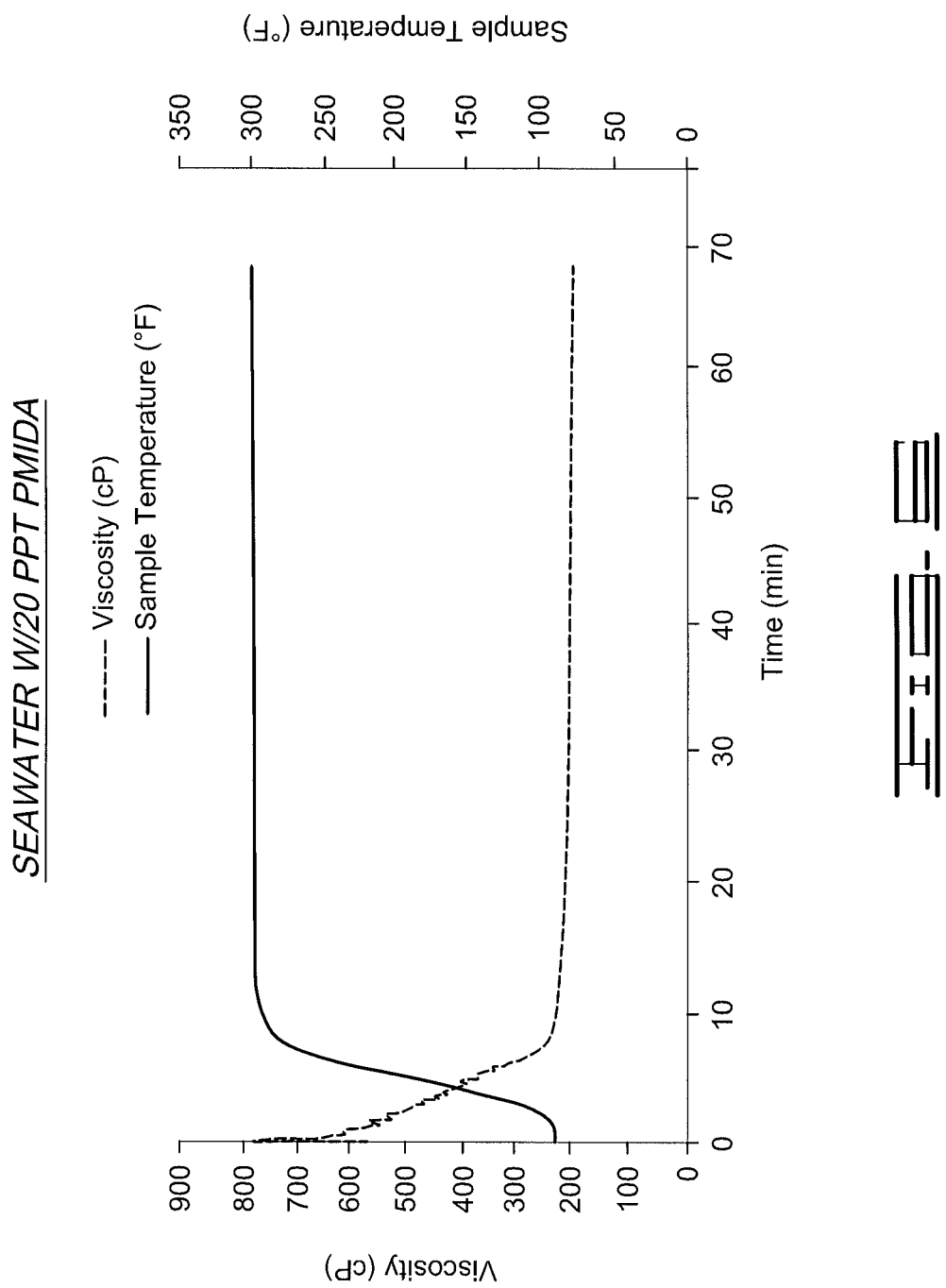

US 10,633,581 B2

COMPOSITION AND METHOD FOR IMPROVED TREATMENT FLUID

FIELD

This disclosure relates to well treatment fluids and, more particularly, to gellable well treatment fluids.

BACKGROUND

High viscosity treatment fluids are used in a variety of operations and treatments carried out in oil and gas wells. Such operations and treatments include, but are not limited to, well completion operations, fluid loss control treatments, production stimulation treatments such as hydraulic fracturing, formation permeability conformance operations and treatments to reduce water production.

Such treatment fluids generally comprise an aqueous base and a gelling component, typically, but not exclusively, a crosslinked gel. Seawater is not generally useful as the aqueous base for the treatment fluid because salts and other minerals present in the seawater can negatively impact treatment fluid additives. Specifically, they can degrade the gelling component and thereby reduce the viscosity of the treatment fluid. For example, metal ions in seawater can reduce the stability and viscosity of the fracturing fluid. Even though seawater is not ideal for use as a treatment fluid, seawater is abundant Therefore, being able to use seawater as a treatment fluid would be beneficial.

BRIEF DESCRIPTION OF THE DRAWINGS

FIG. 5 is a graph demonstrating the impact of increased temperature on a treatment fluid containing N-(phosphonomethyl)-iminodiacetic acid at 10 parts per thousand.

FIG. 6 is a graph demonstrating the impact of increased temperature on a treatment fluid containing N-(phosphonomethyl)-iminodiacetic acid at 20 parts per thousand.

DETAILED DESCRIPTION

Figure 1:
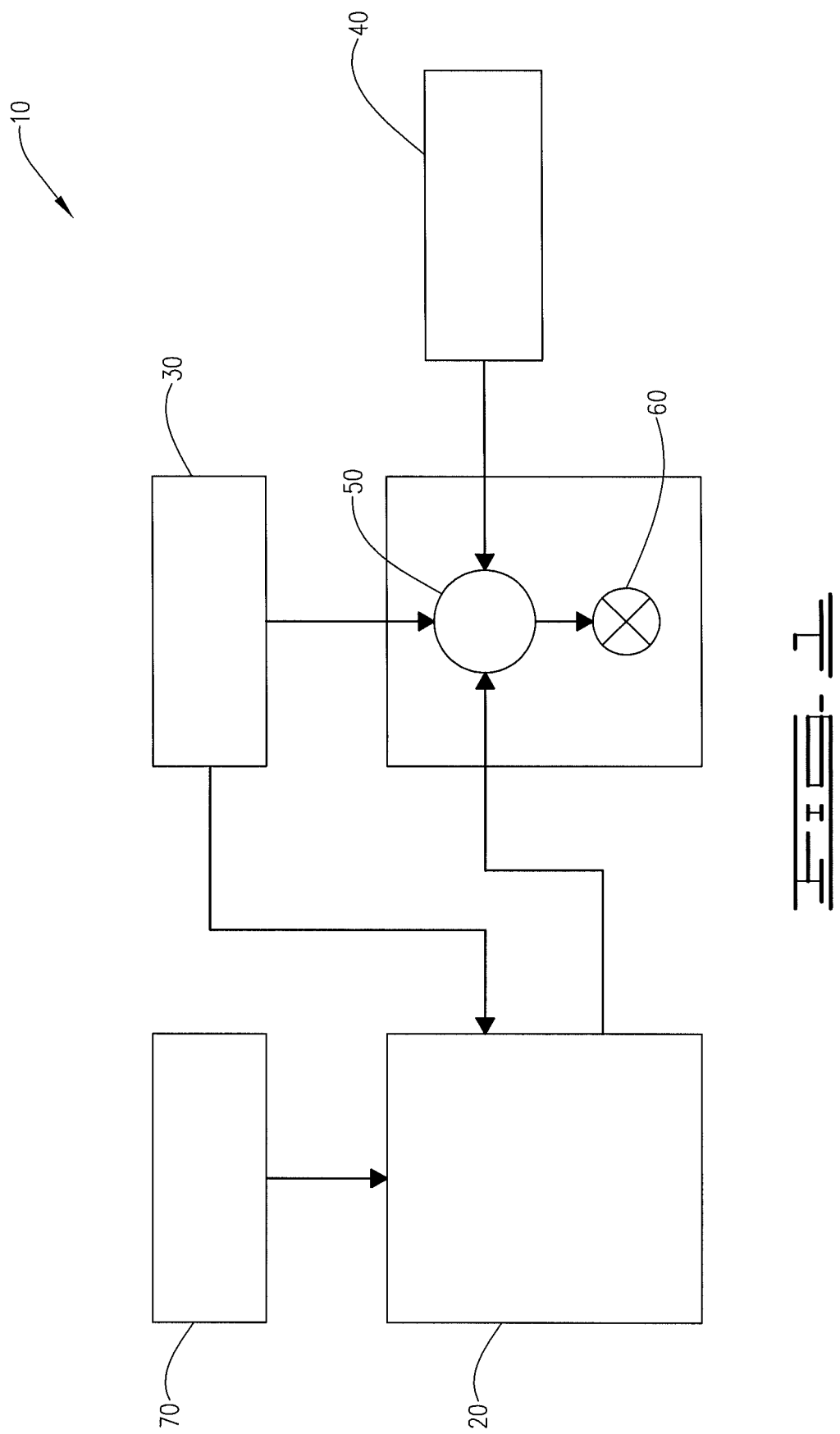
FIG. 1 is a diagram illustrating an example of a fracturing system that may be used in accordance with certain embodiments of the present disclosure.

The exemplary methods and compositions disclosed herein may directly or indirectly affect one or more components or pieces of equipment associated with the preparation, delivery, recapture, recycling, reuse, and/or disposal of the disclosed compositions. For example, in certain instances the treatment fluid can be a fracturing fluid and, with reference to FIG. 1, the disclosed methods and compositions may directly or indirectly affect one or more components or pieces of equipment associated with an exemplary fracturing system 10, according to one or more embodiments. In certain instances, the system 10 includes a fracturing fluid producing apparatus 20, a fluid source 30, a proppant source 40, and a pump and blender system 50 and resides at the surface at a well site where a well 60 is located. In certain instances, the fracturing fluid producing apparatus 20 combines a gel pre-cursor with fluid (e.g., liquid or substantially liquid) from fluid source 30, to produce a hydrated fracturing fluid that is used to fracture the formation. The hydrated fracturing fluid can be a fluid for ready use in a fracture stimulation treatment of the well 60 or a concentrate to which additional fluid is added prior to use in a fracture stimulation of the well 60. In other instances, the fracturing fluid producing apparatus 20 can be omitted and the fracturing fluid sourced directly from the fluid source 30. In certain instances, the fracturing fluid may comprise water, a hydrocarbon fluid, a polymer gel, foam, air, wet gases and/or other fluids.

The proppant source 40 can include a proppant for combination with the fracturing fluid. The system may also include additive source 70 that provides one or more additives (e.g., gelling agents, weighting agents, and/or other optional additives) to alter the properties of the fracturing fluid. For example, the other additives 70 can be included to reduce pumping friction, to reduce or eliminate the fluid's reaction to the geological formation in which the well is formed, to operate as surfactants, and/or to serve other functions.

The pump and blender system 50 receives the fracturing fluid and combines it with other components, including proppant from the proppant source 40 and/or additional fluid from the additives 70. The resulting mixture may be pumped down the well 60 under a pressure sufficient to create or enhance one or more fractures in a subterranean zone, for example, to stimulate production of fluids from the zone. Notably, in certain instances, the fracturing fluid producing apparatus 20, fluid source 30, and/or proppant source 40 may be equipped with one or more metering devices (not shown) to control the flow of fluids, proppants, and/or other compositions to the pumping and blender system 50. Such metering devices may permit the pumping and blender system 50 can source from one, some or all of the different sources at a given time, and may facilitate the preparation of fracturing fluids in accordance with the present disclosure using continuous mixing or "on-the-fly" methods. Thus, for example, the pumping and blender system 50 can provide just fracturing fluid into the well at some times, just proppants at other times, and combinations of those components at yet other times. The above described systems and methods can be collectively referred to as mixing systems and mixing equipment.

Figure 2:
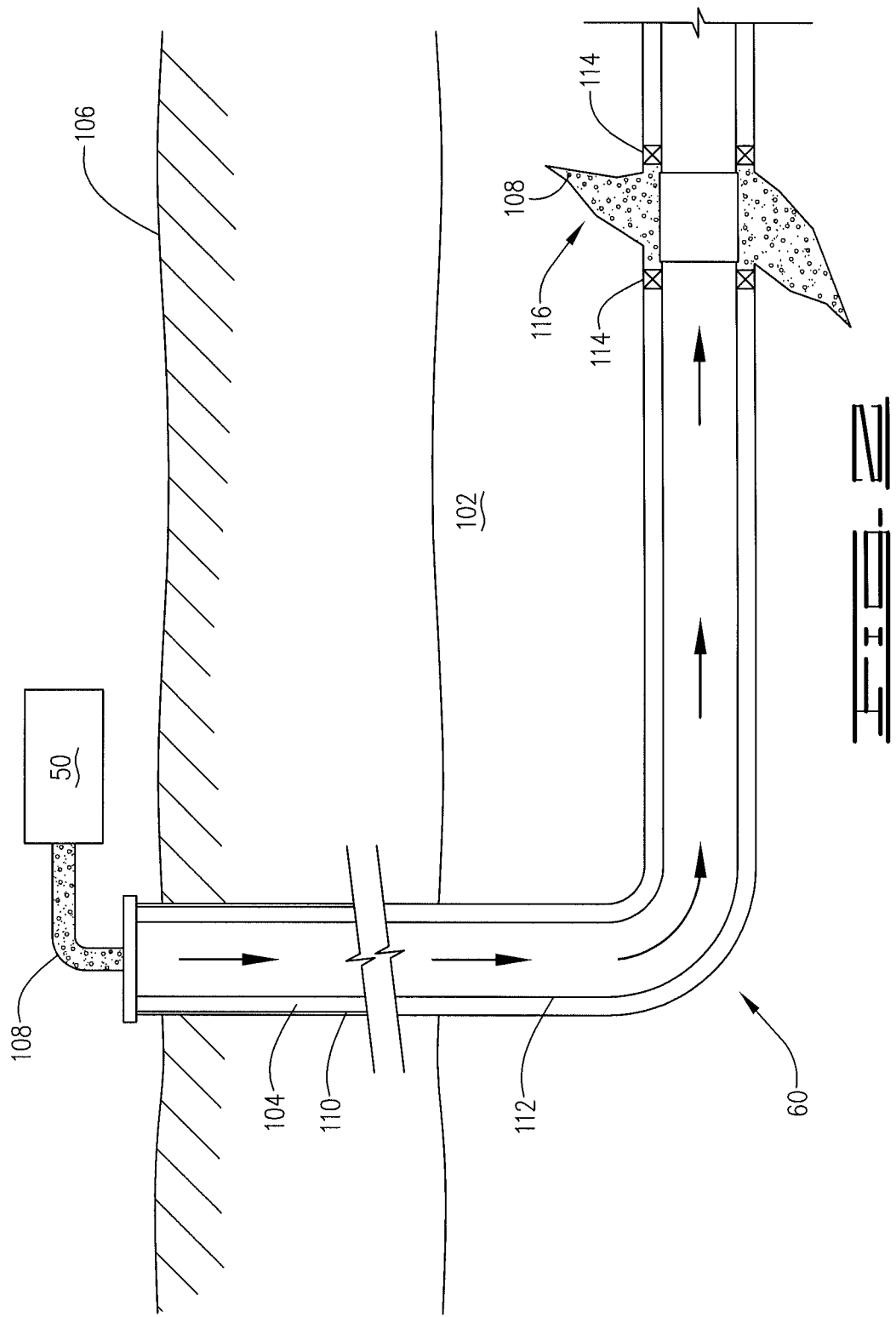
FIG. 2 is a diagram illustrating an example of a subterranean formation in which a fracturing operation may be performed in accordance with certain embodiments of the present disclosure.

FIG. 2 shows the well 60 during a fracturing operation in a portion of a subterranean formation of interest 102 surrounding a well bore 104. The well bore 104 extends from the surface 106, and the fracturing fluid 108 is applied to a portion of the subterranean formation 102 surrounding the horizontal portion of the well bore. Although shown as vertical deviating to horizontal, the well bore 104 may include horizontal, vertical, slanted, curved, and other types of well bore geometries and orientations, and the fracturing treatment may be applied to a subterranean zone surrounding any portion of the well bore. The well bore 104 can include a casing 110 that is cemented or otherwise secured to the well bore wall. The well bore 104 can be uncased or include uncased sections. Perforations can be formed in the casing 110 to allow fracturing fluids and/or other materials to flow into the subterranean formation 102. In cased wells, perforations can be formed using shape charges, a perforating gun, hydro jetting and/or other tools.

The well is shown with a work string 112 depending from the surface 106 into the well bore 104. The pump and blender system 50 is coupled to a work string 112 to pump the fracturing fluid 108 into the well bore 104. The working string 112 may include coiled tubing, jointed pipe, and/or other structures that allow fluid to flow into the well bore 104. The working string 112 can include flow control devices, bypass valves, ports, and or other tools or well devices that control a flow of fluid from the interior of the working string 112 into the subterranean zone 102. For example, the working string 112 may include ports adjacent the well bore wall to communicate the fracturing fluid 108 directly into the subterranean formation 102, and/or the working string 112 may include ports that are spaced apart from the well bore wall to communicate the fracturing fluid 108 into an annulus in the well bore between the working string 112 and the well bore wall.

The working string 112 and/or the well bore 104 may include one or more sets of packers 114 that seal the annulus between the working string 112 and well bore 104 to define an interval of the well bore 104 into which the fracturing fluid 108 will be pumped. FIG. 2 shows two packers 114, one defining an uphole boundary of the interval and one defining the downhole end of the interval. When the fracturing fluid 108 is introduced into well bore 104 (e.g., in FIG. 2, the area of the well bore 104 between packers 114) at a sufficient hydraulic pressure, one or more fractures 116 may be created in the subterranean zone 102. The proppant particulates in the fracturing fluid 108 may enter the fractures 116 where they may remain after the fracturing fluid flows out of the well bore. These proppant particulates may "prop" fractures 116 such that fluids may flow more freely through the fractures 116.

While not specifically illustrated herein, the disclosed methods and compositions may also directly or indirectly affect any transport or delivery equipment used to convey the compositions to the fracturing system 10 such as, for example, any transport vessels, conduits, pipelines, trucks, tubulars, and/or pipes used to fluidically move the compositions from one location to another, any pumps, compressors or motors used to drive the compositions into motion, any valves or related joints used to regulate the pressure or flow rate of the compositions, and any sensors (i.e., pressure and temperature), gauges, and/or combinations thereof, and the like.

Although the disclosure has to this point discussed hydraulic fracturing, the present disclosure relates to treatment fluids more generally. A treatment fluid is any fluid that is useful in causing underground formations to produce hydrocarbons. Fracturing fluid is one type of treatment fluid, but the present disclosure should not be read as limited to fracturing fluids only. In one embodiment, the applicable treatment fluids are gellable treatment fluids using seawater as a fluid base; however, the present application does not relate exclusively to gellable-slickwater applications.

As such, the present disclosure relates to a treatment fluid composition and a method for using the treatment fluid that minimizes the impact of minerals present in seawater on additives in the fracturing fluid. The result is a stable, viscous treatment fluid, even at high temperatures and high pH.

More specifically, the present disclosure relates to a treatment fluid containing N-(phosphonoalkyl) iminodiacetic acid, wherein the alkyl group can include from 1 to 6 carbon atoms. The present disclosure also provides a composition comprising seawater and additives. In one embodiment, the alkyl group contains 1 carbon atom. In such an embodiment, the alkyl group is a methyl group and the compound can be referred to as N-(phosphonomethyl) iminodiacetic acid ("PMIDA"). PMIDA has the chemical formula $C_5H_{10}NO_7P$ and has the structure shown in FIG. 1 below:

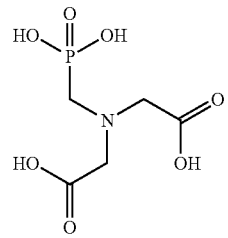

FIG. 1: Structure of PMIDA

PMIDA is an organic acid and displays the necessary elements for the chelation of metal ions. For example, the stability constants log(K) at 20° C. of PMIDA with respect to metal cations naturally present in seawater are shown below:
$Mg^{2+}$: 6.28
$Ca^{2+}$: 7.18
$Sr^{2+}$: 5.59
$Ba^{2+}$: 5.35
Where K has a general definition in the form of:

FIG. 2: Simplified Definition of $K$ $$M + L \rightleftharpoons ML; K = \frac{[ML]}{[M][L]}$$

Because the interaction of PMIDA with cations present in seawater involves substitution, one skilled in the art will recognize that the definition of K will be slightly more complex but still have the general form shown in FIG. 2. Regardless, the stability constants provided show that PMIDA interacts strongly with metal ions in seawater.

As discussed, N-(phosphonoalkyl) iminodiacetic acid, comprises a portion of the treatment fluid, which further comprises seawater. As used herein, seawater means water containing dissolved solids being taken from the sea, ocean or is compositionally similar to water taken therefrom. Table 1 demonstrates a representative composition of seawater.

TABLE 1

| | |
|---|---:|
| Specific Gravity | 1.025 |
| pH | 7.62 |
| OH (mg/L) | 0.00 |
| CO3 (mg/L) | 0.00 |
| HCO3 (mg/L) | 166.20 |
| Chloride (mg/L) | 15,360 |
| Sulfate (mg/L) | 1,837 |
| Al (ppm) | 0.45 |
| B (ppm) | 5.21 |
| Ba (ppm) | 0.05 |
| Ca (ppm) | 419.9 |
| Fe (ppm) | 0.46 |
| K (ppm) | 403.2 |
| Mg (ppm) | 1,336 |
| Na (ppm) | 11,115 |
| Sr (ppm) | 7.87 |
| Total Dissolved Solids (ppm) | 30,234 |
| Ionic Strength (mol/L) | 0.6365 |

Although Table 1 provides a representative composition of seawater, one having skill in the art will recognize that the composition of seawater can vary depending on the depth, location, season and other factors. The present disclosure is applicable to all seawater compositions.

The treatment fluid described in the present disclosure can comprise a gelling agent. Gelling agents are included in treatment fluids for a variety of reasons. For example, gelling agents can increase hole clearing or facilitate the suspension of solids in the treatment fluid. Suitable gelling agents include water-soluble polymers. Such gelling agents include natural and synthetic polymers, preferably having crosslinkable functional groups. Synthetic polymers, such as polyacrylamides and polyacrylates, can be used as the gelling agent.

Natural polymers include high-molecular weight polysaccharides such as cellulose as well as polysaccharides composed of mannose and galactose sugars such as galactomannans. Gelling agents further include polysaccharides composed of mannose and glucose. For example, gelling agents can include cellulose, galactomannans, and xanthan and can include derivatives thereof. Of the various galactomannan gelling agents which can be utilized, guar and guar derivatives are preferred. Guar derivatives, for example, include hydroxypropyl guar (HPG), carboxymethyl guar (CMG), carboxymethylhydroxypropyl guar (CMHPG) and hydroxyethylated guar (HEG). Cellulose derivatives, for example, include hydroxyethylcellulose (HEC), hydroxypropylcellulose (HPC), carboxymethyl cellulose (CMC) and carboxymethylhydroxyethylcellulose (CMHEC). Preferred are galactomannan gelling agents selected from the group consisting of guar, hydroxyethylguar, hydroxypropylguar, carboxymethylguar, carboxymethylhydroxyethylguar glucoside, glucose, xylose, arabinose, fructose, glucuronic acid, pyranosyl sulfate, guar gums including at least hydroxyethyl guar and carboxymethylhydroxyethyl guar, cellulose derivatives including at least carboxyethylcellulose, scleroglucan, diutan and mixtures thereof.

Gelling agents are sometimes activated by the addition of a crosslinker to the treatment fluid. Crosslinkers cause portions of the polymer or polymers comprising the gelling agent to interact with one another. Generally, the more the polymers or chemicals comprising the gelling agent interact with one another, the greater the viscosity of the treatment fluid.

Crosslinkers can be either instant or delayed crosslinkers. Instant crosslinkers tend to cause the polymers comprising the gelling agent to interact with one another quickly. Stated another way, instant crosslinkers cause a quick increase in viscosity or gelling of the treatment fluid. Typically, a substantial increase in viscosity or gelling of the treatment fluid will occur in under a minute and more typically in less than 30 seconds. Delayed crosslinkers tend to cause the polymers comprising the gelling agent to interact with one another more slowly. Depending on the delayed crosslinker, it can take on the order of a minute, several minutes or even an hour or more for a substantial increase in viscosity. Through the use of instant and delayed crosslinkers, the viscosity of the treatment fluid can be carefully controlled. Examples of instant crosslinkers include borate salts, boric acid, or boron trioxide as well as cations of zirconium, titanium aluminum, iron, magnesium as well as compounds containing boron.

Examples of delayed crosslinkers include polyhydroxyl containing compounds including glycerol, erythritol, threitol, ribitol, arabinitol, xylitol, allitol, altritol, sorbitol, mannitol, dulcitol, iditol and perseitol, zirconium-based crosslinkers, based on triethanolamine or hydroxyalkylated ethylenediamine. Although examples of instant and delayed crosslinkers have been provided, whether a particular compound acts as a delayed crosslinker or an instant crosslinker can depend on a variety of circumstances, especially the temperature of the fluid in the wellbore carrying the crosslinker.

The presently described treatment fluid can also contain a gel stabilizer. Gel stabilizers can be used to increase the temperature stability of gelled, aqueous-based fluids so as to create a long-lasting, high-viscosity fluid at a range of temperatures. Suitable gel stabilizers include sodium thiosulfate and sodium thiosulfate containing compositions. An example of a suitable gel stabilizer is a sodium thiosulfate containing composition available from Halliburton Energy Services, Inc., under the trade name Gel-Sta L™ stabilizer. Further examples include methanol and EDTA.

The treatment fluid described in the present disclosure can also contain pH control agents and buffering agents, collectively referred to as pH agents. The pH of the treatment fluid can be increased, decreased or stabilized by pH agents. The pH of the treatment fluid can also be adjusted so as to destroy bacteria present in the treatment fluid. Suitable pH agents include citric acid, soda ash, potassium carbonate, potassium hydroxide, sodium bicarbonate, sodium carbonate or sodium hydroxide. An example of a suitable pH control agent is a solution of 25% sodium hydroxide commercially available from Halliburton Energy Services, Inc., under the trade name MO-67™ pH. Further examples of suitable PH control agents include sodium diacetate, sodium formate, sulfamic acid, acetates, formates. Further examples also include metal and nonmetal carbonates, bicarbonates, borates, hydroxides, and oxides.

As discussed, the pH agent can be a buffering agent. Buffering agents are typically used to stabilize the pH of the treatment fluid. Stabilizing the pH of the treatment fluid results in a fluid that resists changes in pH. The buffering agent typically comprises a solvent, a weak acid or weak base and a salt of the weak acid or weak base. An example of a suitable buffering agent is a potassium carbonate based buffering agent available from Halliburton Energy Services, Inc. under the trade name Ba-40L™. Further examples of suitable buffering agents include sodium diacetate, sodium formate, sulfamic acid and ammonium acetate and acetic acid.

The treatment fluid composition containing N-(phosphonoalkyl) iminodiacetic acid described in the present disclosure can be used to prevent metal ions present in seawater from degrading the bulk properties of the end product by disrupting the desirable interactions of the latter with additives present in the treatment fluid. For example, N-(phosphonoalkyl) iminodiacetic acid's pH is less than 0.5. The introduction of a base will raise the pH and create a PMIDA-salt. A pH of greater than about 5 will bring about chelation of most cations. N-(phosphonoalkyl) iminodiacetic acid is particularly effective at preventing degradation of additives at high temperatures pH greater than 4 to 7. Additionally, N-(phosphonoalkyl) iminodiacetic acid, while effective at lower temperatures, is effective at temperatures greater than 150, 200, 300 or 350° F. and can be effective up to a temperature of 419° F., and in some cases higher.

N-(phosphonoalkyl) iminodiacetic acid is effective at a variety of concentrations in the treatment fluid. For example, N-(phosphonoalkyl) iminodiacetic acid can be present at concentrations at least 5 parts per thousand, 10 parts per thousand or 20 parts per thousand, where parts per thousand means pounds per 1,000 gallons of treatment fluid. For example, N-(phosphonoalkyl) iminodiacetic acid can be present in an amount from 0.01 to 5 percent by weight based on the total weight of the treatment fluid. However, the concentration of N-(phosphonoalkyl) iminodiacetic acid can also be optimized depending on the properties of the seawater and subterranean formation being treated. For example, providing about 1 mol of N-(phosphonoalkyl) iminodiacetic acid for every 2 mols of cations can be effective.

The additives comprising the treatment fluid described in the present disclosure can exist in a variety of concentrations within the treatment fluid. For example, the gelling agent can be present in an amount from 20 to 80, 30 to 60 or 40 to 50 parts per thousand, where parts per thousand is defined as pounds of additive to thousand gallons of treatment fluid. For further example, the pH control agent can be present in an amount from 0.5 to 7.5 percent, 3.5 to 6.5 percent or 4.5 to 5.5 percent based on the total volume of the treatment fluid. For even further example, the gel stabilizer can be present in an amount from 0.5 to 3 percent, 1 and 2.5 percent and 1.5 to 2 percent based on the total volume of the fluid. For continued example, the buffering agent can be present in an amount from 0.4 to 1.6 percent, 0.6 to 1.4 percent or 0.8 to 1.2 percent based on the total volume of the fluid. For additional example, the delayed crosslinker can be present in the treatment fluid in an amount from 0.6 to 1.2, 0.8 to 1.1 or 0.9 to 1.0 percent based on the total volume of the fluid. For extra example, the instant crosslinker can be present in an amount from 0.05 to 0.2, 0.06 to 0.15 or 0.08 to 0.12 percent based on the total volume of the fluid.

In addition to the composition described herein, the present disclosure also relates to a method for providing the disclosed composition into a subterranean hydrocarbon containing formation. Such a method comprises preparing a treatment fluid comprising N-(phosphonoalkyl) iminodiacetic acid, seawater, a gelling agent and crosslinkers, pumping the treatment fluid into a well bore and introducing the treatment fluid into the subterranean formation. Optionally, the method for providing the treatment fluid to the underground formation can include any of the steps related to hydraulic fracturing described earlier in the present disclosure. Optionally, a system for providing the treatment fluid to the underground formation can include any of the components related to hydraulic fracturing described earlier in the present disclosure.

EXAMPLES

The following examples are provided to illustrate presently provided process. The examples are not intended and should not be taken to limit, modify or define the scope of the present disclosure in any manner.

Two procedures were used in order to create a treatment fluid, one not containing PMIDA and the other containing PMIDA. Of those treatment fluids containing PMIDA, a treatment fluid was provided having 5, 10 and 20 parts per thousand of PMIDA. The impact of increased viscosity was examined for each of the compositions.

The treatment fluid not containing PMIDA was created in the following manner. The fluid was prepared by adding a gelling agent to the seawater and allowing it to hydrate for 45 minutes. The gelling agent used was a guar based gelling agent marketed under the trade name WG-11™ by Halliburton Energy Services, Inc. This produced a base gel with a viscosity of 68 centipoise and a pH of 7.01. Once the base gel was hydrated, a sodium thiosulfate containing gel stabilizer (Gel-Sta L™ stabilizer) and a delayed crosslinker were added and allowed to mix for about one minute. When these additives were properly mixed, the pH control additive (Mo-67™ control agent) and a buffer (Ba-40L™ buffering agent), and the instant crosslinker were added resulting in a pH over 12.90. The fluid was mixed until it began to crosslink in the blender and a dome-over of the fluid was witnessed. At this point, 44 mL of the crosslinked fluid were added to the cup of a Chandler 5550 rheometer. The rotor speed for the test was 50 reciprocal seconds, and the temperature was ramped to 300° F. over five minutes time and then held constant for the remainder of the test. The results of the above procedure are demonstrated in graph 1 below.

The treatment fluid containing PMIDA was created in the following manner. The fluid was prepared by adding a gelling agent to the seawater and allowing it hydrate for 45 minutes. This produced a base gel with a viscosity of 68 centipoise and a pH of 7.01. Once the base gel was hydrated, the Gel-Sta L™ additive and the delayed crosslinker were added and allowed to mix for about one minute. When these additives were properly mixed, the PMIDA was added to the mixture and allowed to mix thoroughly. When the PMIDA was properly mixed, the pH control additives, Mo-67™ and Ba-40L™ and the instant crosslinker were added which gave a pH of over 12.90. The fluid was mixed until it began to crosslink in the blender jar and a dome-over was witnessed. At this point, 44 mL of the crosslinked fluid were added to the cup of a Chandler 5550 rheometer. The rotor speed for the test was 40 reciprocal seconds, and the temperature, was ramped to 300° F. over five minutes time and then held constant for the remainder of the test. The results of this procedure are demonstrated in FIGS. 4, 5 and 6.

Figure 3:
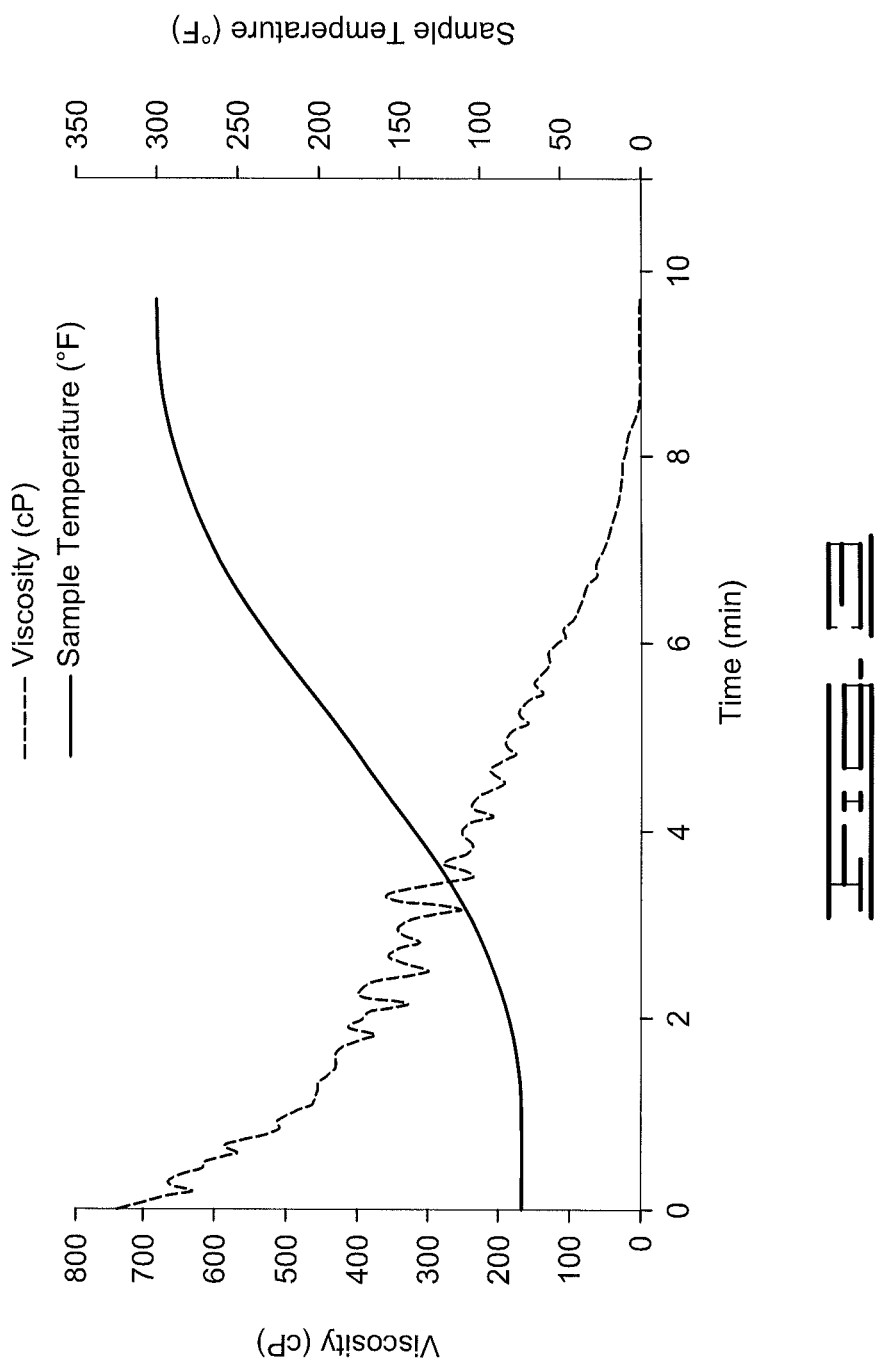
FIG. 3 is a graph demonstrating the impact of increased temperature on a treatment fluid containing no N-(phosphonomethyl)-iminodiacetic acid.

Turning to FIG. 3, the provided graph demonstrates that at high temperatures and high pH, the viscosity of the treatment fluid not containing PMIDA is compromised. The viscosity of the treatment fluid at pH 12.90 and at between 50 and 100° F. is between 600 and 700 centipoise. However, as the temperature of the sample is increased to approximately 300° F., the viscosity of the treatment fluid is degraded considerably, to near zero centipoise.

Figure 4:
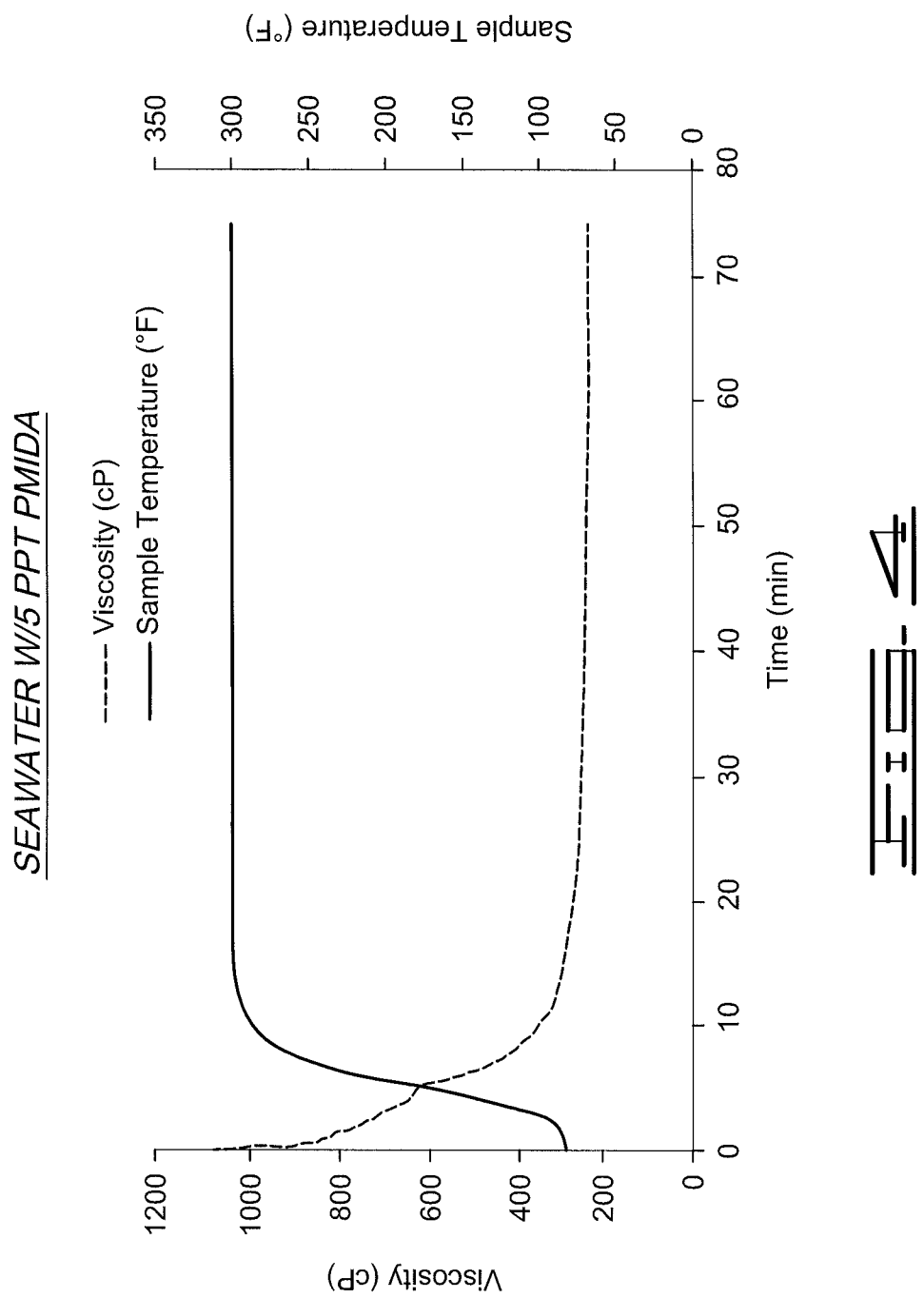
FIG. 4 is a graph demonstrating the impact of increased temperature on a treatment fluid containing N-(phosphonomethyl)-iminodiacetic acid at 5 parts per thousand.

Turning to FIG. 4, the provided graph demonstrates that at high temperature and high pH, the viscosity of a treatment fluid containing 5 parts per thousand PMIDA is better preserved. The viscosity of the treatment fluid at pH 12.90 and between 50 and 100° F. is between 1200 and 1000 centipoise. As the temperature of the sample is increased to approximately 300° F., the viscosity of the fluid is degraded. However, unlike the sample containing no PMIDA, the viscosity of the treatment fluid stabilizes around 200 centipoise.

Turning to FIG. 5, the provided graph demonstrates that at high temperature and high pH, the viscosity of a treatment fluid containing 10 parts per thousand PMIDA is better preserved. The viscosity of the treatment fluid at pH 12.90 and between 50 and 100° F. is between 1200 and 1000 centipoise. As the temperature of the sample is increased to approximately 300° F., the viscosity of the fluid is degraded. However, unlike the sample containing no PMIDA, the viscosity of the treatment fluid stabilizes between 200 and 400 centipoise.

Turning to FIG. 6, the provided graph demonstrates that at high temperature and high pH, the viscosity of a treatment fluid containing 20 parts per thousand PMIDA is better preserved. The viscosity of the treatment fluid at pH 12.90 and between 50 and 100° F. is between 700 and 800 centipoise. As the temperature of the sample is increased to approximately 300° F., the viscosity of the fluid is degraded. However, unlike the sample containing no PMIDA, the viscosity of the treatment fluid stabilizes around 200 centipoise. As demonstrated by FIGS. 3, 4, 5 and 6, PMIDA increases the viscosity of a treatment fluid containing a gelling agent at high pH and high temperature.

The present disclosure can be adapted to provide a number of embodiments. By way of example only, the present disclosure provides the following examples of suitable systems and methods.

As an example, the present disclosure provides a treatment fluid comprising N-(phosphonoalkyl)iminodiacetic acid, seawater, a gelling agent and a crosslinker. In one embodiment, the alkyl group is a methyl group. For further example, such a treatment fluid can contain N-(phosphonoalkyl)-iminodiacetic acid in the treatment fluid in an amount from 4 to 21 parts per thousand. Additionally, the treatment fluid can further comprise a gel stabilizer, buffering agent or pH control agent. For further example, the treatment fluid is provided wherein the pH of the treatment fluid is greater than 4. In another example, the gelling agent is present in the treatment fluid in an amount from 20 to 80 parts per thousand. In an additional example, the pH control agent is present in the treatment fluid in an amount from 2.5 to 6.5 percent based on the total volume of the fluid. In an even further example, the gel stabilizer is present in the treatment fluid in an amount from 0.5 to 3 percent based on the total volume of the fluid. In an added example, the buffering agent is present in the treatment fluid in an amount from 0.6 to 1.4 percent based on the total volume of the fluid. In a supplementary example, the delayed crosslinker is present in the treatment fluid in an amount form 0.6 to 1.2 percent based on the total volume of the fluid. In a further additional example, the instant crosslinker is present in the treatment fluid in an amount from 0.6 to 1.3 percent based on the total volume of the treatment fluid. For an even further example, all of the above non-mutually exclusive limitations can be present in the treatment fluid simultaneously.

By way of further example, the present disclosure provides a treatment fluid consisting essentially of N-(phosphonomethyl) iminodiacetic acid, seawater, a gelling agent and at least one compound selected from the group consisting of a crosslinker, a gel stabilizer, a buffering agent and a pH control agent. As a further example, such a treatment fluid can have a crosslinker and at least one compound selected from the group consisting of a gel stabilizer, a buffering agent and a pH control agent. In an even further example, the treatment fluid has an instant crosslinker and a delayed crosslinker.

As an even further added example, the present disclosure provides a method for treating a hydrocarbon containing formation comprising providing a treatment fluid which itself comprised N-(phosphonomethyl) iminodiacetic acid, seawater, a gelling agent and a crosslinker. The method further comprises introducing the treatment fluid into a subterranean formation. In some embodiments the subterranean formation is at a temperature greater than 150, 200, 300, or 350° F. In other embodiments the subterranean formation is at a temperature from 150° F. to 419° F., from 250° F. to 419° F., from 350° F. to 419° F., or from 350° F. to 419° F. In further embodiments, the pH of the treatment fluid will be greater than about 4. As an extra example, the treatment fluid further comprises an additive selected from the group consisting of a gelling agent, a pH control agent, a gel stabilizer, a buffering agent, a delayed crosslinker and an instant crosslinker. In one example, the method described above comprises mixing the treatment fluid and the described additives using mixing equipment. As an added example, the described method comprises introducing the treatment fluid into a subterranean formation using one or more pumps.

Therefore, the present disclosure is well adapted to attain the ends and advantages mentioned, as well as those that are inherent therein. The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified, and all such variations are considered within the scope and spirit of the present disclosure. While compositions and methods are described in terms of "comprising," "containing," "having," or "including" various components or steps, the compositions and methods can also "consist essentially of" or "consist of" the various components and steps. Whenever a numerical range with a lower limit and an upper limit is disclosed, any number and any included range falling within the range are specifically disclosed. In particular, every range of values (of the form, "from about A to about B," or, equivalently, "from approximately A to B," or, equivalently, "from approximately A-B") disclosed herein is to be understood to set forth every number and range encompassed within the broader range of values. Also, the terms in the claims have their plain, ordinary meaning unless otherwise explicitly and clearly defined by the patentee.

What is claimed is:

1. A method for treating a subterranean formation comprising:
   (a) providing a treatment fluid comprising:
      a N-(phosphonoalkyl)iminodiacetic acid;
      seawater; and
      a gelling agent, wherein the gelling agent is present in the treatment fluid in an amount from 20 to 80 parts per thousand, and wherein said N-(phosphonoalkyl) iminodiacetic acid is present in the treatment fluid in an amount of at least 4 parts per thousand so as to reduce the adverse effects of salts and minerals in the seawater on the viscosity of the treatment fluid such that the treatment fluid has a viscosity of at least about 150 cP after 6 minutes at a temperature above 200° F.; and
   (b) introducing the treatment fluid into the subterranean formation having a temperature of greater than 200° F.

2. The method of claim 1, further comprising mixing the treatment fluid using mixing equipment.

3. The method of claim 2 wherein the treatment fluid is introduced into the subterranean formation using one or more pumps.

4. The method of claim 1, wherein said N-(phosphonoalkyl)iminodiacetic acid is present in the treatment fluid in an amount of from 0.4 to 5 percent by weight based on the total weight of said treatment fluid.

5. The method of claim 1, wherein said treatment fluid further comprises a gel stabilizer.

6. The method of claim 1, wherein said treatment fluid further comprises a crosslinker.

7. The method of claim 1, wherein said treatment fluid further comprises a gel stabilizer and crosslinkers.

8. The method of claim 1, wherein said alkyl group of said N-(phosphonoalkyl)iminodiacetic acid of said treatment fluid contains from 1 to 6 carbon atoms.

9. The method of claim 1, wherein said alkyl group of said N-(phosphonoalkyl)iminodiacetic of said treatment fluid contains 1 carbon atom.

10. The method of claim 5, wherein said treatment fluid further comprises an additive selected from the group consisting of a pH control agent, a buffering agent, and mixtures thereof.

11. The method of claim 10, wherein said treatment fluid has a pH greater than 4.

12. The method of claim 4, wherein said method for treating the subterranean formation is a method of fracturing a hydrocarbon containing formation.

13. A method for treating a subterranean formation comprising:
(a) providing a treatment fluid comprising:
an N-(phosphonoalkyl)iminodiacetic acid, wherein said alkyl group of said N-(phosphonoalkyl)iminodiacetic acid contains from 1 to 6 carbon atoms;
seawater;
a gelling agent; and
a gel stabilizer, wherein the gelling agent is present in the treatment fluid in an amount from 20 to 80 parts per thousand, and wherein said N-(phosphonoalkyl) iminodiacetic acid is present in the treatment fluid in an amount of at least 4 parts per thousand so as to reduce the adverse effects of salts and minerals in the seawater on the viscosity of the treatment fluid such that the treatment fluid has a viscosity of at least about 150 cP after 6 minutes at a temperature above 200° F.; and
(b) introducing the treatment fluid into the subterranean formation having a temperature of greater than 200° F.

14. The method of claim 13, wherein said N-(phosphonoalkyl)iminodiacetic acid is present in the treatment fluid in an amount of from 0.4 to 5 percent by weight based on the total weight of said treatment fluid.

15. The method of claim 13, wherein said treatment fluid further comprises a crosslinker.

16. The method of claim 13, wherein said alkyl group of said N-(phosphonoalkyl)iminodiacetic of said treatment fluid contains 1 carbon atom.

17. The method of claim 13, wherein said treatment fluid further comprises an additive selected from the group consisting of a pH control agent, a buffering agent, and mixtures thereof.

18. The method of claim 13, wherein said method for treating a hydrocarbon containing formation is a method of fracturing subterranean formation.

* * * * *